(12) United States Patent
Shen

(10) Patent No.: US 11,423,509 B2
(45) Date of Patent: Aug. 23, 2022

(54) METHOD AND APPARATUS FOR DISPLAYING FACE OF VIRTUAL ROLE, COMPUTER DEVICE, AND READABLE STORAGE MEDIUM

(71) Applicant: TENCENT TECHNOLOGY (SHENZHEN) COMPANY LIMITED, Shenzhen (CN)

(72) Inventor: Chao Shen, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 17/315,562

(22) Filed: May 10, 2021

(65) Prior Publication Data
US 2021/0264563 A1 Aug. 26, 2021

Related U.S. Application Data

(63) Continuation of application No. PCT/CN2020/082695, filed on Apr. 1, 2020.

(30) Foreign Application Priority Data

Apr. 26, 2019 (CN) .......................... 201910342925.7

(51) Int. Cl.
*G06T 3/00* (2006.01)
*A63F 13/213* (2014.01)
(Continued)

(52) U.S. Cl.
CPC .......... *G06T 3/0093* (2013.01); *A63F 13/213* (2014.09); *A63F 13/655* (2014.09); *G06V 40/166* (2022.01); *G06V 40/168* (2022.01)

(58) Field of Classification Search
CPC ....... G06T 3/0093; G06T 13/40; G06T 13/80; A63F 13/213; A63F 13/655
(Continued)

(56) References Cited

U.S. PATENT DOCUMENTS 9,799,096 B1 * 10/2017 De la Torre .......... A63F 13/655
2007/0127844 A1 * 6/2007 Watanabe ............ G06V 40/171
382/276
(Continued)

FOREIGN PATENT DOCUMENTS

CN 101149840 A 3/2008
CN 101944163 A 1/2011
(Continued)

OTHER PUBLICATIONS

Narendra Patel, Mukesh Zaveri, "3D Facial Model Construction and Animation From a Single Frontal Face Image," 2011, International Conference on Communications and Signal Processing, pp. 203-207 (Year: 2011).*

(Continued)

*Primary Examiner* — Michael Le
(74) *Attorney, Agent, or Firm* — Crowell & Moring LLP

(57) ABSTRACT

The present disclosure describes a method and apparatus for displaying a face of a virtual role, a terminal, and a storage medium, and relates to the field of human-machine interaction. The method includes obtaining a face parameter corresponding to a user face, the face parameter being used for indicating a facial feature of a face region of the user face. The method also includes determining a warping control parameter according to the face parameter, the warping control parameter being used for controlling a warping degree of a face region of a virtual role; generating a virtual role face image according to the warping control parameter and a warping image set, the warping image set comprising (Continued)

a basic face image and at least one basic warping face image of the virtual role, and different basic warping face images corresponding to different face warping manners; and displaying the virtual role face image.

14 Claims, 11 Drawing Sheets

(51) Int. Cl.
*A63F 13/655* (2014.01)
*G06V 40/16* (2022.01)

(58) Field of Classification Search
CPC .. A63F 2300/5553; A63F 13/55; A63F 13/92; A63F 13/52; A63F 13/822; G06V 40/166; G06V 40/168; G06V 40/171; G06V 40/174
See application file for complete search history.

(56) References Cited

U.S. PATENT DOCUMENTS

| | | | |
|---|---|---|---|
| 2010/0202697 A1* | 8/2010 | Matsuzaka | G06V 40/168 382/209 |
| 2011/0091113 A1* | 4/2011 | Ito | G06T 3/0093 382/197 |
| 2014/0218371 A1 | 8/2014 | Du et al. | |
| 2016/0328825 A1* | 11/2016 | Yu | G06V 40/165 |
| 2018/0115746 A1 | 4/2018 | Wang | |
| 2019/0035149 A1* | 1/2019 | Chen | G06T 17/20 |
| 2020/0234034 A1* | 7/2020 | Savchenkov | G06N 3/04 |

FOREIGN PATENT DOCUMENTS

| | | | | |
|---|---|---|---|---|
| CN | 106331572 A | | 1/2017 | |
| CN | 108573527 A | | 9/2018 | |
| CN | 108876879 A | | 11/2018 | |
| CN | 109120866 A | | 1/2019 | |
| CN | 109241810 A | | 1/2019 | |
| CN | 109308727 A | | 2/2019 | |
| CN | 109325437 A | * | 2/2019 | ......... G06K 9/00228 |
| CN | 109325437 A | | 2/2019 | |
| CN | 110141857 A | | 8/2019 | |

OTHER PUBLICATIONS

CN109325437A (Machine Translation on Mar. 9, 2022) (Year: 2018).*
Chinese Office Action with English Concise Explanation of Relevance regarding CN201910342925.7 dated Jan. 4, 2022, 9 pages.
Chinese Office Action with concise English translation regarding CN201910342925.7 dated Sep. 2, 2021.
International Search Report with concise translation and Written Opinion regarding PCT/CN2020/082695, 10 pages.
Chinese Office Action with concise English explanation regarding 201910342925.7 dated Mar. 4, 2021, 18 pages.
Extended European Search Report regarding 20794269.9 dated May 23, 2022.
Beier et al., "Feature-based image metamorphosis," Computer Graphics And Interactive Techniques, Acm, New York, NY, Jul. 1, 1992, pp. 35-42.
Ezzat et al., "MikeTalk: a talking facial display based on morphing visemes," Computer Animation 98. Proceedings Philadelphia, PA, Los Alamitos, CA, IEEE Comput. Soc, Jun. 8, 1998, pp. 96-102.

* cited by examiner

METHOD AND APPARATUS FOR DISPLAYING FACE OF VIRTUAL ROLE, COMPUTER DEVICE, AND READABLE STORAGE MEDIUM

RELATED APPLICATION

This application is a continuation application of PCT Patent Application No. PCT/CN2020/082695, filed on Apr. 1, 2020, which claims priority to Chinese Patent Application No. 201910342925.7, filed with the National Intellectual Property Administration, PRC on Apr. 26, 2019, both of which are incorporated herein by reference in their entireties.

FIELD OF THE TECHNOLOGY

Embodiments of this application relates to the field of man-machine interaction, and in particular, to a method and apparatus for displaying a face of a virtual role, a computer device, and a readable storage medium.

BACKGROUND OF THE DISCLOSURE

To increase the sense of presence of users in games, more and more game applications, especially role-playing game applications, start to support a virtual role selection function.

In different types of game applications, types of virtual roles may be different. For example, a virtual role may be a human, an animal, a comic character, or the like. During the game, the user may use a physical key or a virtual joystick to control the virtual role to move, attack or perform other operations.

The present disclosure describes various embodiments to improve the intelligence level of displaying a facial expression and improve the quality of facial expression imitation of the virtual role.

SUMMARY

According to embodiments of this application, a method and apparatus for displaying a face of a virtual role, a computer device, and a readable storage medium are provided.

The present disclosure describes a method for displaying a face of a virtual role. The method includes obtaining, by a device, a face parameter corresponding to a user face, the face parameter being used for indicating a facial feature of a face region of the user face. The device includes a memory storing instructions and a processor in communication with the memory. The method also includes determining, by the device, a warping control parameter according to the face parameter, the warping control parameter being used for controlling a warping degree of a face region of a virtual role; generating, by the device, a virtual role face image according to the warping control parameter and a warping image set, the warping image set comprising a basic face image and at least one basic warping face image of the virtual role, and different basic warping face images corresponding to different face warping manners; and displaying, by the device, the virtual role face image.

The present disclosure describes an apparatus for displaying a face of a virtual role. The apparatus includes: a memory storing instructions; and a processor in communication with the memory. When the processor executes the instructions, the processor is configured to cause the apparatus to: obtain a face parameter corresponding to a user face, the face parameter being used for indicating a facial feature of a face region of the user face, determine a warping control parameter according to the face parameter, the warping control parameter being used for controlling a warping degree of a face region of a virtual role, generate a virtual role face image according to the warping control parameter and a warping image set, the warping image set comprising a basic face image and at least one basic warping face image of the virtual role, and different basic warping face images corresponding to different face warping manners, and display the virtual role face image.

The present disclosure describes a non-transitory computer-readable storage medium storing computer-readable instructions. The computer-readable instructions, when executed by a processor, are configured to cause the processor to perform: obtaining a face parameter corresponding to a user face, the face parameter being used for indicating a facial feature of a face region of the user face; determining a warping control parameter according to the face parameter, the warping control parameter being used for controlling a warping degree of a face region of a virtual role; generating a virtual role face image according to the warping control parameter and a warping image set, the warping image set comprising a basic face image and at least one basic warping face image of the virtual role, and different basic warping face images corresponding to different face warping manners; and displaying the virtual role face image.

The present disclosure describes another embodiment for a method for displaying a face of a virtual role is provided, including:

obtaining a face parameter corresponding to a user face, the face parameter being used for indicating a facial feature of a corresponding face region of the user face;

determining a warping control parameter according to the face parameter, the warping control parameter being used for indicating a warping degree of a corresponding face region of a virtual role;

generating a virtual role face image according to the warping control parameter and a warping image set, the warping image set including a basic face image and at least one basic warping face image of the virtual role, and different basic warping face images being corresponding to different warped face regions; and displaying the virtual role face image.

The present disclosure describes another embodiment for an apparatus for displaying a face of a virtual role, including:

a first obtaining module, configured to obtain a face parameter corresponding to a user face, the face parameter being used for indicating a facial feature of a corresponding face region of the user face;

a determining module, configured to determine a warping control parameter according to the face parameter, the warping control parameter being used for indicating a warping degree of a corresponding face region of a virtual role;

a first generating module, configured to generate a virtual role face image according to the warping control parameter and a warping image set, the warping image set including a basic face image and at least one basic warping face image of the virtual role, and different basic warping face images being corresponding to different warped face regions; and a display module, configured to display the virtual role face image.

The present disclosure describes another embodiment for a terminal is provided, including a processor and a memory, the memory storing at least one instruction, at least one program, a code set or an instruction set, the at least one instruction, the at least one program, the code set or the instruction set being loaded and executed by the processor to implement the method for displaying a face of a virtual role provided in the embodiments of this application.

The present disclosure describes another embodiment for a computer-readable storage medium is provided, storing at least one instruction, at least one program, a code set or an instruction set, the at least one instruction, the at least one program, the code set or the instruction set being loaded and executed by a processor to implement the method for displaying a face of a virtual role provided in the embodiments of this application.

The present disclosure describes another embodiment for a computer program product is provided, the computer program product, when run on a computer, causing the computer to perform the method for displaying a face of a virtual role provided in the embodiments of this application.

Details of one or more embodiments of this application are provided in the accompanying drawings and descriptions below. Other features and advantages of this application become obvious with reference to the specification, the accompanying drawings, and the claims.

BRIEF DESCRIPTION OF THE DRAWINGS

To describe the technical solutions in embodiments of this application more clearly, the following briefly describes the accompanying drawings required for describing the embodiments. Apparently, the accompanying drawings in the following descriptions show only some embodiments of this application, and a person of ordinary skill in the art may still derive other accompanying drawings from the accompanying drawings without creative efforts.

DESCRIPTION OF EMBODIMENTS

To make the objectives, technical solutions, and advantages of this application clearer, the following further describes implementations of this application in detail with reference to the accompanying drawings. It is to be understood that the specific embodiments described herein are merely used for explaining this application but are not intended to limit this application.

A method for displaying a face of a virtual role provided in the embodiments of this application may be applied to a terminal installed with a target application program. The target application program is an application program having two-dimensional (2D) virtual role display requirements, and the terminal may be a smartphone, a tablet computer, a personal computer, a portable computer, or the like. For example, the target application program is a role-playing game, a social application program, an instant messaging application program, a camera application program, an expression production application program, or the like, which is not limited in the embodiments of this application.

Moreover, because a 2D virtual role in the target application program can imitate a real-time facial expression of a user, the terminal installed with the target application program has an external image acquisition function. In a possible implementation, the terminal has a built-in camera component (such as a front-facing camera), so that a face image of the user is acquired in real time by using the camera component.

The method for displaying a face of a virtual role provided in the embodiments of this application is described below with reference to several exemplary application scenarios.

I. Game Scenario

In a game scenario, the method for displaying a face of a virtual role provided in the embodiments of this application may be implemented as a functional module (configured to drive the face of the virtual role) in a game application program. In a process that a user controls a virtual role to play a game, the game application program may request the terminal to enable the front-facing camera, and obtain a face image of the user acquired by the front-facing camera. After processing the obtained face image of the user, the game application program obtains a warping control parameter corresponding to the virtual role, so as to generate a virtual role face image corresponding to an expression in the face image of the user according to the warping control parameter and a warping image set, and display the virtual role face image in a game screen. The game application program may drive the virtual role in real time according to the face image of the user to make a corresponding facial expression (that is, the facial expression of the virtual role is consistent with an expression of the user), thereby increasing the sense of presence of the user during the game and improving game experience of the user.

Figure 1:
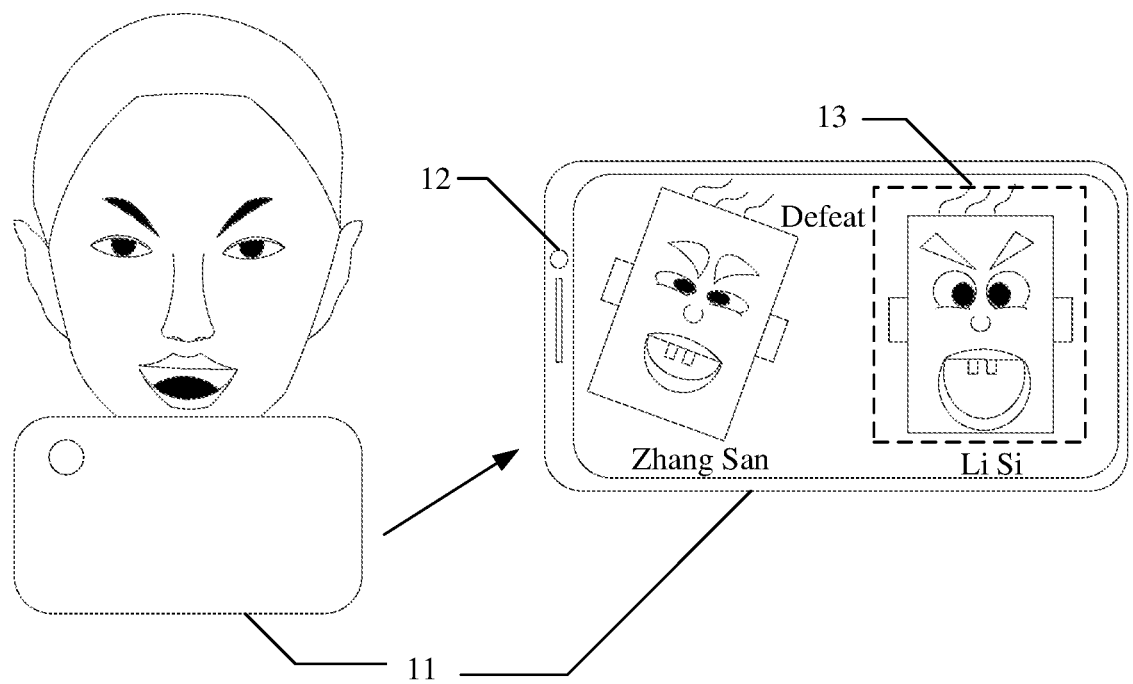
FIG. 1 is a schematic diagram of an application scenario according to an exemplary embodiment of this application.

Schematically, as shown in FIG. 1, a game application program is installed in a terminal 11, and the user fights by controlling a virtual role "Li Si" in the game application program. "Li Si" is a typical representative Chinese name, which may be analogous to "Bob" in English names. "Zhang San" is another typical representative Chinese name, which may be analogous to "Tom" in English names.

When the fighting fails, the game application program acquires a face image of the user by using a front-facing camera 12 of the terminal 11, thereby driving a virtual role 13 to present the same facial expression according to the face image, increasing the sense of presence of the user during the game.

II. Instant Messaging Scenario

In an instant messaging scenario, the method for displaying a face of a virtual role provided in the embodiments of this application may be implemented as a functional module (a function of video chat with the help of the virtual role) in an instant messaging application program. In a possible use scenario, before making a video call, users may respectively select a 2D virtual role. During the video call, the instant messaging application program starts the camera of the terminal, and obtains a face image of the user at a local end acquired by using the camera in real time. After processing the face image of the user in the local end, the instant messaging application program obtains a first warping control parameter corresponding to the virtual role at the local end, sends the first warping control parameter to a peer terminal, and simultaneously receives a second warping control parameter corresponding to a virtual role of the user at the peer end sent by the peer terminal. The instant messaging application program generates a virtual role face image of the user at the peer end according to the second warping control parameter and a warping image set corresponding to the virtual role of the user at the peer end, and displays the virtual role face image in a video call interface (a virtual role face image of the user at the local end may also be displayed simultaneously).

III. Expression Production Scenario

In an expression production scenario, the method for displaying a face of a virtual role provided in the embodiments of this application may be implemented as a functional module (configured to produce a virtual role expression) in an expression production application program. In a possible use scenario, when a user uses a virtual role expression production function of the expression production application program, a virtual role, which may be required for the expression production application program, is first selected. After selecting the virtual role, the user may click/tap an expression recording button in a production interface, to trigger the terminal to enable the front-facing camera to acquire a face image of the user. The expression production application program obtains the acquired face image of the user, to obtain a warping control parameter of the virtual role, so as to generate a virtual role face image according to the warping control parameter and a warping image set corresponding to the virtual role. After an expression is recorded, the expression production application program integrates a series of virtual role face images generated in the process of expression recording, to generate dynamic virtual role expressions, and saves the dynamic virtual role expressions in a predetermined expression format for use in other application programs.

Certainly, the foregoing several possible application scenarios are only used for exemplary description. The method provided in the embodiments of this application may further be applied to other application scenarios that need to display a virtual role. A specific application scenario is not limited in the embodiments of this application.

Figure 2:
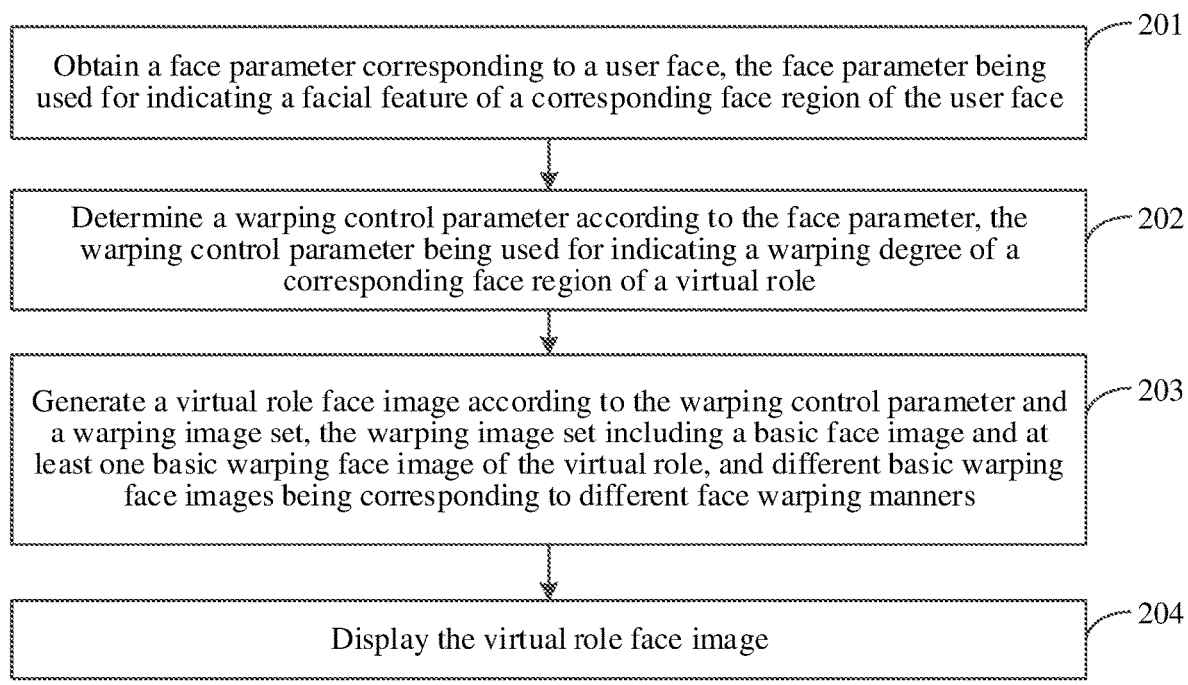
FIG. 2 is a flowchart of a method for displaying a face of a virtual role according to an exemplary embodiment of this application.

FIG. 2 is a flowchart of a method for displaying a face of a virtual role according to an exemplary embodiment of this application. A description is made in this embodiment by using an example in which the method is applied to a terminal installed with an application program (having a virtual role display function), and the method includes the following steps:

Step 201. An application program obtains a face parameter corresponding to a user face, the face parameter being used for indicating a facial feature of a corresponding face region of the user face. In one implementation, the application program may include instructions, and when the instructions are executed by a processor, the processor is configured to perform a portion or all of the described steps. In another implementation, the application program may be installed in an electronic device; the electronic device includes a memory storing instructions and a processor; and when the processor executes the instructions, the processor is configured to cause the electronic device to perform a portion or all of the described steps.

In a possible implementation, when a terminal has a function of generating a face parameter according to a face image of a user (that is, has a capability of packaging the face parameter), the face parameter is directly obtained from the application program by the terminal. Alternatively, when the terminal has only a function of acquiring a face image of the user but does not have a function of packaging and generating a face parameter, the face parameter is generated by the application program according to the face image of the user acquired by the terminal (by using a camera).

Optionally, the face parameter complies with a preset (or predefined) face parameter standard, and the preset face parameter standard specifies at least one of a parameter type, a parameter value range, and a quantity of parameters of face parameters. The parameter type is used for indicating a face region corresponding to each face parameter, the parameter value range is used for indicating a parameter change interval of each face parameter, and the quantity of parameters is used for indicating a total quantity of parameters in the face parameters. In one implementation, the preset (or predefined) face parameter standard may be pre-stored in the application program and/or in the terminal. In another implementation, the quantity of parameters may be used for indicating a total quantity of parameter types in the face parameters.

Step 202. The application program determines a warping control parameter according to the face parameter, the warping control parameter being used for indicating a warping degree of a corresponding face region of a virtual role.

Optionally, the virtual role may be at least one of a human, an animal, and a comic character, and the virtual role may be selected, by the user, from optional virtual roles provided in the application program, and may be generated by the user in the application program in a customized manner.

Optionally, a face warping parameter of the virtual role is predefined in the application program. The face warping parameter complies with a preset (or predefined) warping parameter standard, and the preset warping parameter standard specifies at least one of a parameter type, a parameter value range, and a quantity of parameters of face warping parameters. The parameter type being used for indicating a face warping manner corresponding to the face warping parameter, the parameter value range being used for indicating a warping degree range of a warped face region, and the quantity of parameters being used for indicating a total quantity of parameters in the face warping parameters. In one implementation, the preset (or predefined) warping parameter standard may be pre-stored in the application program and/or in the terminal. In another implementation, the quantity of parameters may be used for indicating a total quantity of parameter types in the face warping parameters.

In an exemplary example, the face warping parameters defined in the application program are shown in Table 1.

TABLE 1

| Parameter | Note |
| --- | --- |
| PARAM_ANGLE_X | Turn head aside |
| PARAM_ANGLE_Y | Turn head |

TABLE 1-continued

| Parameter | Note |
| --- | --- |
| PARAM_ANGLE_Z | Raise head/lower head |
| PARAM_EYE_L_OPEN | Open left eye |
| PARAM_EYE_L_SMILE | Left eye smiling |
| PARAM_EYE_R_OPEN | Open right eye |
| PARAM_EYE_R_SMILE | Right eye smiling |
| PARAM_EYE_BALL_X | X-axis direction of eyeball |
| PARAM_EYE_BALL_Y | Y-axis direction of eyeball |
| PARAM_BROW_L_Y | Height of left eyebrow |
| PARAM_BROW_R_Y | Height of right eyebrow |
| PARAM_BROW_L_ANGLE | Angle of right eyebrow |
| PARAM_BROW_R_ANGLE | Angle of left eyebrown |
| PARAM_BROW_L_FORM | Right eyebrow shape |
| PARAM_BROW_R_FORM | Right eyebrow shape |
| PARAM_MOUTH_FORM | Mouth shape |
| MOUTH_X | Horizontal direction of mouth corner |
| MOUTH_Y | Height direction of mouth corner |
| CHEEK | Cheek |

However, the warping control parameter in this embodiment of this application is used for controlling the warping degree of the corresponding face region by controlling the face warping parameter. Optionally, each face warping parameter corresponds to a warping control parameter.

Step 203. The application program generates a virtual role face image according to the warping control parameter and a warping image set, the warping image set including a basic face image and at least one basic warping face image of the virtual role, and different basic warping face images being corresponding to different face warping manners.

The virtual role in the embodiments of this application is not a three-dimensional (3D) virtual role formed by using points, lines, and surfaces, but is a 2D virtual role formed by the warping image set based on a defined warping rule. The warping image set includes a basic face image and at least one basic warping face image of the virtual role, and each basic warping face image may be obtained, based on the basic face image, by adjusting one face warping parameter.

Optionally, a quantity of basic warping face images in the warping image set are associated with a quantity of face warping manners (that is, a quantity of face warping parameters) supported by the virtual role. Each basic warping face image corresponds to a face warping manner. When a face of the virtual role includes at least one face warping manner, the warping image set includes at least one basic warping face image.

Figure 3:
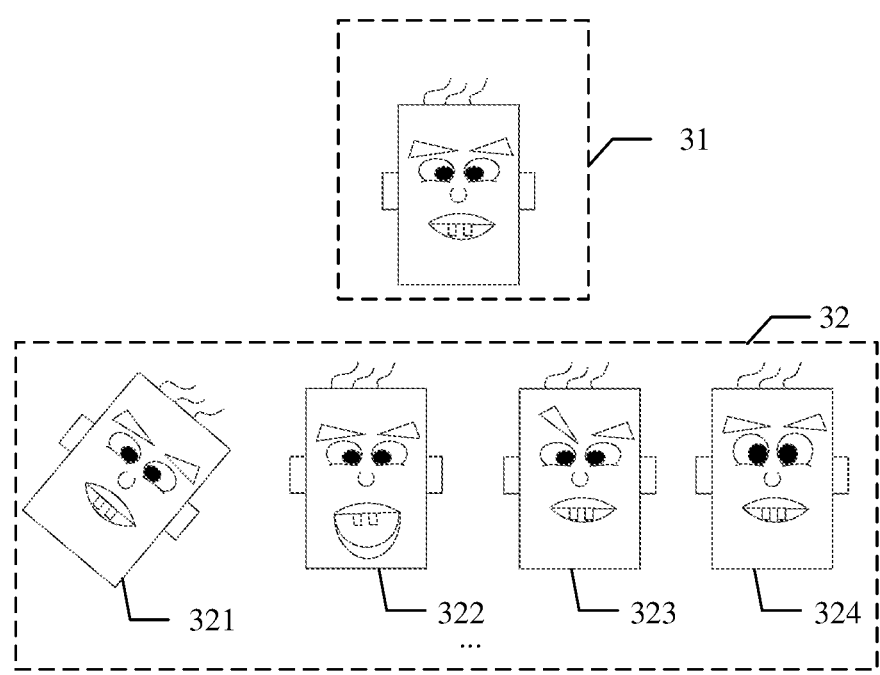
FIG. 3 is a schematic diagram of a basic face image and a basic warping face image that are in a warping image set.

In an exemplary example, as shown in FIG. 3, the warping image set includes a basic face image 31 and several basic warping face images 32. A warping manner corresponding to a first basic warping face image 321 is turning head, a warping manner corresponding to a second basic warping face image 322 is opening mouth, a warping manner corresponding to a third basic warping face image 323 is raising an eyebrow, and a warping manner corresponding to a fourth basic warping face image 324 is opening eyes wide.

In a possible implementation, for the basic face image and any one of the basic warping face images, a parameter is needed to control a degree of a difference between the two images, and the parameter is the warping control parameter in the foregoing step. Correspondingly, the application program generates, according to the warping control parameter, the basic face image, and the basic warping face image, a virtual role face image that conforms to a current facial expression of the user.

Step 204. The application program displays the virtual role face image.

Optionally, the application program draws and displays each frame of the virtual role face image in real time according to a face parameter obtained in real time, so as to present real-time facial expression changes of the user on the virtual role. In one implementation, "real time" may refer to substantially at the same time or substantially simultaneous. In another implementation, "real time" may refer to the situation that when Event A occurs in real time according to Event B occurring, Event A occurs right after Event B occurs.

In a possible implementation, when the application program is a game application program, the game application program displays the virtual role face image in a game interface. When the application program is an instant messaging application program, the instant messaging application program displays the virtual role face image in a video call interface. When the application program is an expression production application program, the expression production application program displays the virtual role face image in an expression recording interface.

In another possible implementation, the application program may send a warping control parameter of a virtual role corresponding to a user at a local end to a peer application program, and receive a warping control parameter that is of a virtual role corresponding to a user at a peer end and that is sent by the application program, so as to simultaneously display the virtual role face images of the user at the local end and the user at the peer end.

Figure 4:
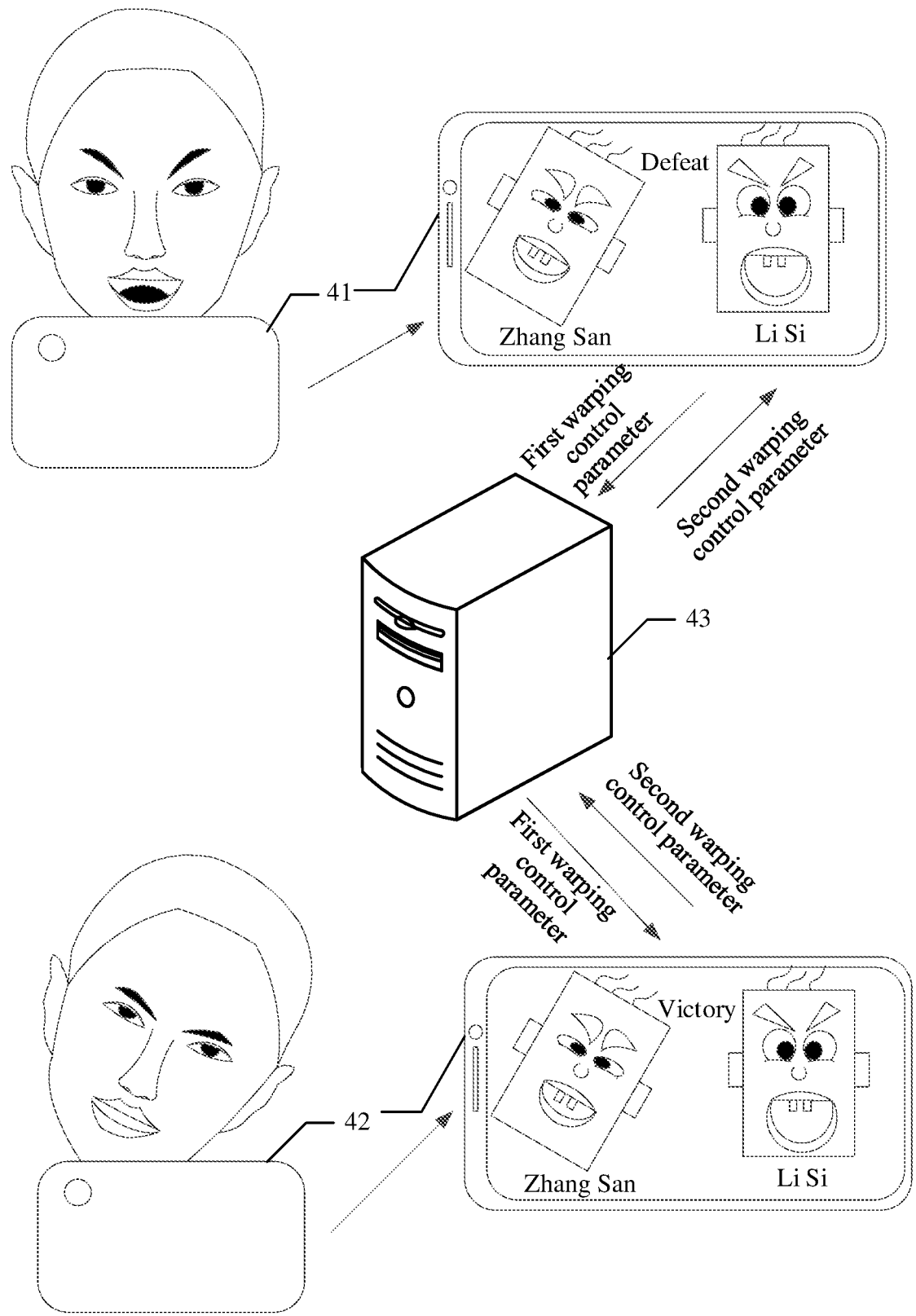
FIG. 4 is a schematic interface diagram of an implementation process of the method shown in FIG. 2.

Schematically, as shown in FIG. 4, a user Li Si who uses a terminal 41 and a user Zhang San who uses a terminal 42 are in a game battle. When the battle ends, game applications in the terminal 41 and in the terminal 42 respectively acquire face images of the users at local ends, and obtain a warping control parameter of the virtual roles of the users at the local ends. The terminal 41 sends a first warping control parameter to the terminal 42 by using a server 43, and the terminal 42 sends a second warping control parameter to the terminal 41 by using the server 43. The terminal 41 and the terminal 42 respectively display facial expressions of the virtual roles at peer ends by using the game applications.

Compared with the related art in which a 2D virtual role can only display a predetermined expression according to a preset logic (which is essentially playing an animation and involves no real-time rendering on a facial expression of the virtual role), in this embodiment of this application, the virtual role in the application program can imitate a real-time facial expression of the user, thus enriching a presentation mode of the facial expression of the virtual role, and improving an intelligence level of displaying the facial expression of the virtual role.

Based on the above, in this embodiment of this application, the warping control parameter of the virtual role is determined by obtaining the face parameter of the user face and according to the face parameter, and the virtual role face image is generated and displayed according to the warping control parameter and the basic face image and the basic warping face image in the warping image set. Compared with the related art in which the 2D virtual role can only display a preset facial expression, in this embodiment of this application, the 2D virtual role can be driven to imitate a real-time expression of the user, thereby improving the intelligence level of displaying a facial expression, and achieving an effect of enriching a presentation mode of a face of the 2D virtual role.

In a possible implementation, when the terminal has a capability of packaging a face parameter, for example, the terminal uses an augmented reality kit (ARKit) of Apple Inc., the application program may directly obtain face parameters (obtain 51 face parameters from the ARKit) of the user face from the terminal.

However, not all the terminals have a function of packaging the face parameter. To enable other terminals that do not have the function of packaging the face parameter to implement the foregoing method, the application program may process the face image acquired from the terminal, to obtain a corresponding face parameter.

Figure 5:
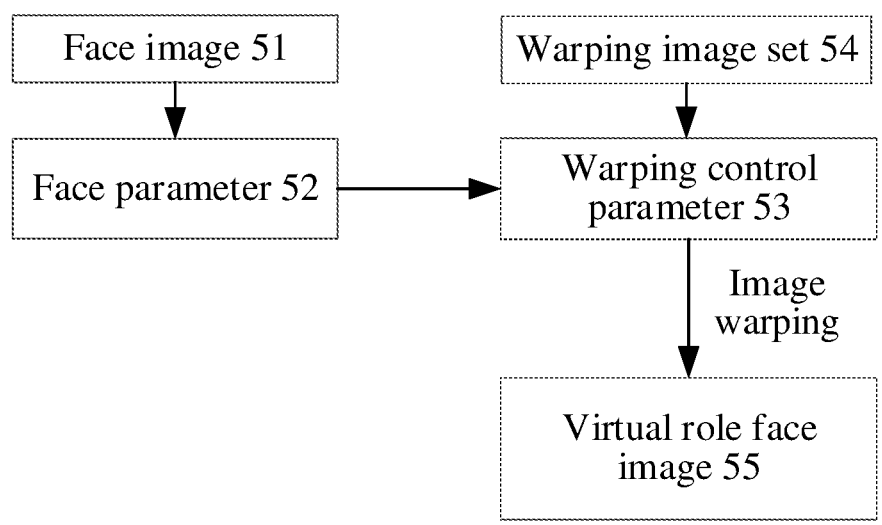
FIG. 5 is a schematic diagram of the principle of a method for displaying a face of a virtual role.

As shown in FIG. 5, after obtaining a face image 51 from the terminal, the application program generates a face parameter 52 of the user face according to the face image 51 to determine a warping control parameter 53 of a virtual role according to the face parameter 52. Further, the application program performs image warping on images in a warping image set 54 according to the warping control parameter 53, to generate a virtual role face image 55, and displays the virtual role face image 55. A schematic embodiment is provided below for description.

Figure 6:
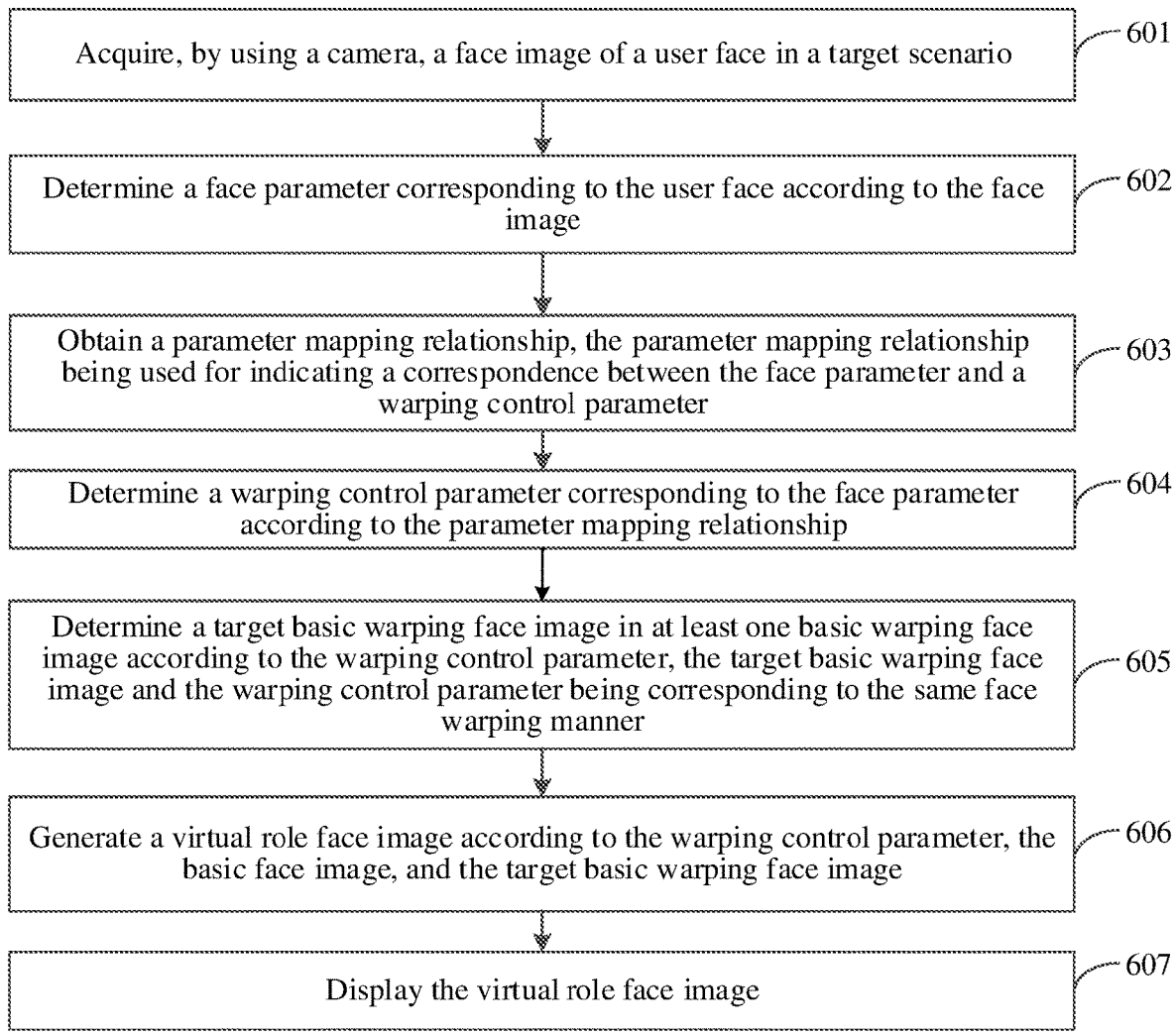
FIG. 6 is a flowchart of a method for displaying a face of a virtual role according to another exemplary embodiment of this application.

FIG. 6 is a flowchart of a method for displaying a face of a virtual role according to another exemplary embodiment of this application. A description is made in this embodiment by using an example in which the method is applied to a terminal installed with an application program (having a virtual role display function), and the method includes the following steps:

Step 601. The application program acquires, by using a camera, a face image of a user face in a target scenario.

When a virtual role is driven to present expressions of a user in real time, processing resources need to be consumed, and the user does not expect the virtual role to imitate the expressions of the user in all scenarios. Therefore, in a possible implementation, only in the target scenario does the application program acquire the face image by using the camera. When not in the target scenario, the application program displays the virtual role according to a preset application program logic.

Optionally, different application programs correspond to different target scenarios. For example, the application program is a game application program, when in a game settlement scenario or in a game cutscene, the application program acquires the face image by using the camera. A specific type of the target scenario is not limited in the embodiments of this application.

In a possible implementation, because the quality of the face image directly affects the quality of a virtual role face image, for the acquired face image, the application program determines the quality of the face image according to factors such as image sharpness and an imaging angle of the face image, and prompts the user to adjust a terminal attitude when the face image does not meet quality requirements, so as to improve the acquisition quality of the face image.

Step 602. The application program determines a face parameter corresponding to the user face according to the face image.

In a possible implementation, when the camera of the terminal is a depth camera, the acquired face image includes depth data corresponding to each pixel point, and the application program determines the face parameter corresponding to the user face according to the depth data of each pixel point.

Optionally, a developer of the application program uses a sample face depth image (sample input, including the depth data of each pixel point) and a sample face parameter (sample output, including a pre-labeled face parameter) corresponding to the sample face depth image as training samples in advance, to train a neural network, thereby obtaining a face parameter prediction model configured to predict a face parameter according to the face image. The face parameter prediction model may use a convolutional neural network (CNN).

In an application process, the application program inputs (the depth data in) the acquired face image to the face parameter prediction model, to obtain a face parameter outputted by the face parameter prediction model.

Certainly, in addition to predicting a face parameter by using a neural network model, the application program may alternatively extract the face parameter from the face image in other manners, for example, determine a face key point according to the depth data, so as to determine a face parameter according to the face key point. This is not limited in this embodiment.

In another possible implementation, when the camera of the terminal is a red-green-blue (RGB) camera, the acquired face image is an RGB image. The application program recognizes a face key point in the RGB image, and determines each face region according to the face key point, so as to generate a corresponding face parameter.

Step 603. The application program obtains a parameter mapping relationship, the parameter mapping relationship being used for indicating a correspondence between the face parameter and a warping control parameter.

In a possible implementation, because the face parameter of the face image and the warping control parameter of the virtual role are preset, the developer of the application program may preset the parameter mapping relationship between the face parameter and the warping control parameter. In an application process, the application program determines the warping control parameter based on the parameter mapping relationship.

Step 604. The application program determines a warping control parameter corresponding to the face parameter according to the parameter mapping relationship.

Optionally, the application program determines each warping control parameter of the virtual role according to the parameter mapping relationship.

In an exemplary example, the face parameters obtained by the application program include ARBlendShapeLocation-BrowOuterUpRight=0.8 (which represents an upward movement of the outer portion of the right eyebrow), and based on the parameter mapping relationship, the application program determines that a warping control parameter is 0.7.

Through the foregoing steps 601 to 604, after the application program obtains the warping control parameter of the virtual role from the face image, image warping is further performed on a facial expression of the virtual role through step 605 and step 606 below.

Step 605. The application program determines a target basic warping face image in at least one basic warping face image according to the warping control parameter, the target basic warping face image and the warping control parameter being corresponding to the same face warping manner.

Because different basic warping face images correspond to different warping manners (face warping parameters), for each obtained warping control parameter, the application program determines, from the at least one basic warping face image, a target basic warping face image correspond to the same face warping manner as the warping control parameter, so as to subsequently perform image warping on the basic face image and the target basic warping face image based on the warping control parameter.

In a possible implementation, each basic warping face image in the warping image set includes a corresponding warping identifier (which indicates a changed face warping parameter). The application program determines, from the basic warping face images, the target basic warping face image according to the warping identifiers.

Optionally, if a specific warping control parameter indicates that the face region is not warped, the application program does not need to determine the target basic warping face image corresponding to the warping control parameter.

Figure 7:
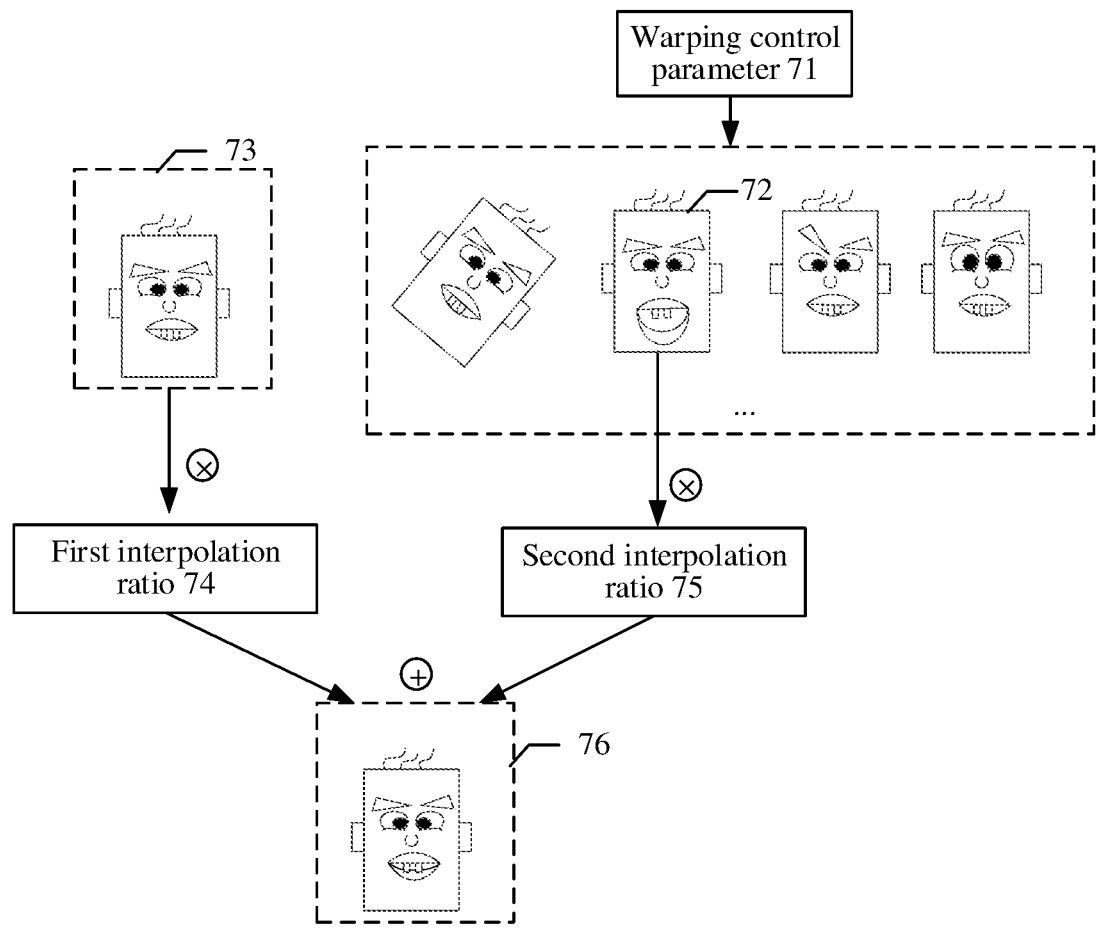
FIG. 7 is a schematic diagram of implementing a process of generating a virtual role face image in the embodiment shown in FIG. 6.

Schematically, as shown in FIG. 7, because a warping control parameter 71 is used for controlling a mouth opening range, the application program determines a basic warping face image 72 as the target basic warping face image.

Step 606. The application program generates a virtual role face image according to the warping control parameter, the basic face image, and the target basic warping face image.

In this embodiment of this application, the warping control parameter is used for controlling a degree of a difference between the basic face image and the target basic warping face image. A greater warping control parameter indicates that the generated virtual role face image is closer to the target basic warping face image, otherwise, the generated virtual role face image is closer to the basic face image.

In a possible implementation, a process of generating the virtual role face image by the application program may include the following steps:

I. Determine at least one interpolation ratio according to the warping control parameter. In one implementation, the at least one interpolation ratio includes two interpolation ratios including a first interpolation ratio corresponding to the basic face image and a second interpolation ratio corresponding to the target basic warping face image, and the at least one interpolation ratio being used for controlling an interpolation degree between the basic face image and the target basic warping face image.

Optionally, the first interpolation ratio is used for controlling an image warping degree of the basic face image, and the second interpolation ratio is used for controlling an image warping degree of the target basic warping face image. The first interpolation ratio is in a negative correlation with the warping control parameter, the second interpolation ratio is in a positive correlation with the warping control parameter, and a sum of the first interpolation ratio and the second interpolation ratio is 1.

In an exemplary example, when the warping control parameter is 0.7, the application program determines the first interpolation ratio as 0.3, and determines the second interpolation ratio as 0.7.

Schematically, as shown in FIG. 7, the application program determines a first interpolation ratio 74 and a second interpolation ratio 75 according to a warping control parameter 71.

II. Generate the virtual role face image according to the basic face image, the first interpolation ratio, the target basic warping face image, and the second interpolation ratio.

In a possible implementation, the application program performs image warping (mainly distorting polygons in the image) on the basic face image according to the first interpolation ratio, and performs image warping on the target basic warping face image according to the second interpolation ratio. Warping results of the basic face image and the target basic warping face image are superimposed to obtain the virtual role face image.

Schematically, as shown in FIG. 7, the application program performs image warping on a basic face image 73 according to the first interpolation ratio 74, and performs image warping on a target basic warping face image 72 according to the second interpolation ratio 75. Warping results of the basic face image 73 and the target basic warping face image 72 are superimposed to obtain a virtual role face image 76.

When a plurality of warping control parameters corresponding to different face regions are included, the application program performs the foregoing steps on each warping control parameter, and superimposes warping results corresponding to the warping control parameters to generate the virtual role face image.

Step 607. The application program displays the virtual role face image.

For the implementation of this step, refer to the foregoing step 204.

In this embodiment, in a case that the terminal does not have a function of packaging the face parameter, the application program can determine the face parameter corresponding to the user face according to the acquired face image, thereby reducing a limitation to the terminal and expanding application scenarios of the foregoing method.

In addition, in this embodiment, the application program selects, from the basic warping face images, the target basic warping face image corresponding to the same face warping manner as the warping control parameter according to the warping control parameter, to perform image warping based on the target basic warping face image and the basic face image, and finally obtains a warped virtual role face image, thereby implementing targeted warping for different face regions and improving a speed and accuracy of the warping.

In a possible application scenario, when the game application program supports to customize the virtual role, the user may customize facial features of the virtual role. In this case, a preset parameter mapping relationship in the application program may not be suitable for customizing the virtual role (a change of the face warping parameter causes a change of the warping control parameter). If the warping control parameter corresponding to the face parameter is still determined according to the preset parameter mapping relationship in the application program subsequently, accuracy of a determined warping control parameter is affected, and an effect of a generated virtual role face image is further affected.

Figure 8:
FIG. 8 is a flowchart of a method for displaying a face of a virtual role according to another exemplary embodiment of this application.

To avoid the problem, in a possible implementation, based on the embodiment shown in FIG. 6, as shown in FIG. 8, the method may further include the following steps:

Step 608. The application program generates a sample virtual role face image according to a sample warping control parameter.

In this embodiment, the application program introduces a parameter learning framework. When a face parameter set and/or a face warping parameter set changes, the application program can automatically learn a correspondence between changed parameters by using the parameter learning framework.

In a possible implementation, after the user customizes the virtual role, the application program randomly generates a sample warping control parameter corresponding to the face warping parameter according to a face warping parameter corresponding to the customized virtual role, and further generates a sample virtual role face image according to the sample warping control parameter and a warping image set.

In an exemplary example, the application program randomly generates sample warping control parameters A1, B1, and C1 according to face warping parameters A, B, and C corresponding to the customized virtual role, performs image warping on an image in the warping image set according to the sample warping control parameters A1, B1, and C1, and generates the sample virtual role face image.

Step 609. The application program displays the sample virtual role face image in a face entry interface, and obtains a sample face image, the sample face image being a face image acquired in a case that the user imitates the sample virtual role face image.

To learn a correspondence between a warping control parameter and a face parameter, optionally, the application program displays the generated sample virtual role face image in the face entry interface, and displays prompt information in the face entry interface, to prompt the user to imitate a facial expression presented by the sample virtual role face image, and acquires the sample face image of the user by using a camera.

Figure 9:
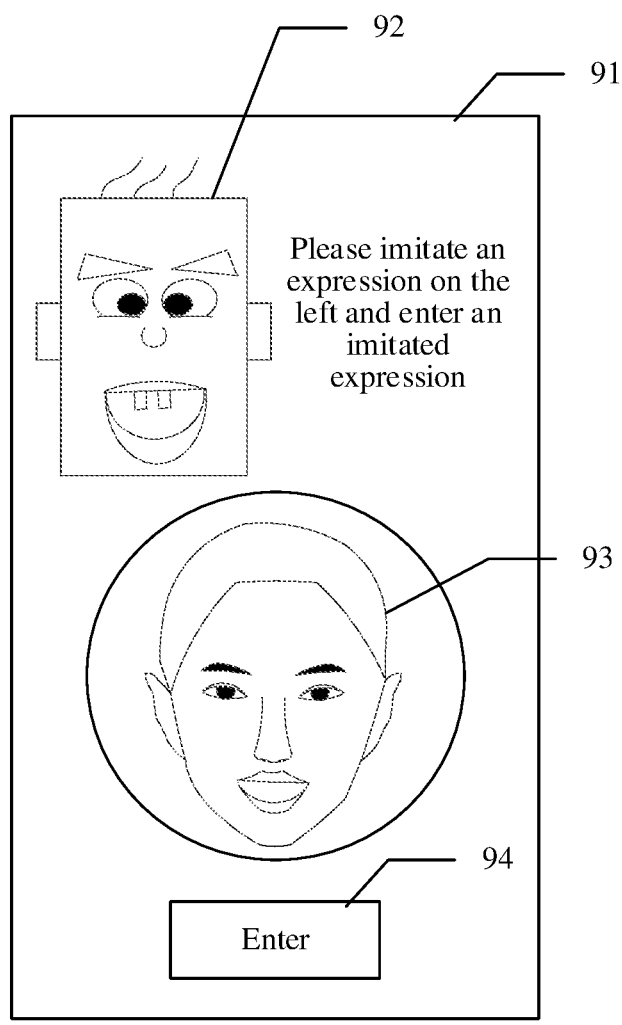
FIG. 9 is a schematic interface diagram of a face entry interface.

Schematically, as shown in FIG. 9, a sample virtual role face image 92 is displayed in a face entry interface 91 of an application program. When a user imitates a facial expression of the sample virtual role face image 92 according to an instruction, a sample face image 93 acquired by using a camera is displayed in a viewfinder frame. When the user clicks/taps an entry button 94, the application program obtains the sample face image 93.

Step 610. The application program generates a sample correspondence according to the sample warping control parameter and a sample face parameter corresponding to the sample face image.

In a possible implementation, for the obtained sample face image, the application program extracts the sample face parameter from the sample face image, to construct the sample correspondence between the sample face parameter and the sample warping control parameter. For a manner of extracting the sample face parameter from the sample face image, reference may be made to step 602.

Step 611. The application program generates a parameter mapping relationship according to a plurality of groups of the sample correspondences.

In a possible implementation, the application program may repeatedly perform steps 608 to 610, to obtain the plurality of groups of the sample correspondences, and further generate the parameter mapping relationship according to the plurality of groups of the sample correspondences. In a subsequent application process, the terminal determines the warping control parameter according to the generated parameter mapping relationship.

For the manner of generating the parameter mapping relationship, optionally, the application program solves, by using a linear regression model and using the sample face parameters as an observation matrix and the sample warping control parameters as observation values, a parameter conversion matrix (that is, the parameter mapping relationship) in the model by using a least square method, where a linear regression equation formed by the observation matrix, the observation values, and the parameter conversion matrix may be expressed as:

$$\begin{pmatrix} 1 & t_{11} & \ldots & t_{1j} & \ldots & t_{1q} \\ 1 & t_{21} & \ldots & t_{1j} & \ldots & t_{2q} \\ \ldots & \ldots & \ldots & \ldots & \ldots & \ldots \\ 1 & t_{i1} & \ldots & t_{ij} & \ldots & t_{iq} \\ \ldots & \ldots & \ldots & \ldots & \ldots & \ldots \\ 1 & t_{n1} & \ldots & t_{nj} & \ldots & t_{nq} \end{pmatrix} \cdot \begin{pmatrix} b_0 \\ b_1 \\ b_2 \\ \ldots \\ b_i \\ \ldots \\ b_q \end{pmatrix} = \begin{pmatrix} y_1 \\ y_1 \\ \ldots \\ y_i \\ \ldots \\ y_n \end{pmatrix} \text{ where}$$

$$\begin{pmatrix} 1 & t_{11} & \ldots & t_{1j} & \ldots & t_{1q} \\ 1 & t_{21} & \ldots & t_{1j} & \ldots & t_{2q} \\ \ldots & \ldots & \ldots & \ldots & \ldots & \ldots \\ 1 & t_{i1} & \ldots & t_{ij} & \ldots & t_{iq} \\ \ldots & \ldots & \ldots & \ldots & \ldots & \ldots \\ 1 & t_{n1} & \ldots & t_{nj} & \ldots & t_{nq} \end{pmatrix}$$

is the observation matrix, $$\begin{pmatrix} b_0 \\ b_1 \\ b_2 \\ \ldots \\ b_j \\ \ldots \\ b_q \end{pmatrix}$$

is the parameter conversion matrix, and $$\begin{pmatrix} y_1 \\ y_1 \\ \ldots \\ y_i \\ \ldots \\ y_n \end{pmatrix}$$

are the observation values.

In another possible implementation, in a case that a virtual role is not customized, the application program may update the preset parameter mapping relationship by using the foregoing steps, to improve a matching degree of the parameter mapping relationship and facial features of the user and further improve the quality of the generated virtual role face image.

Certainly, the preset parameter mapping relationship in the application program may also be generated by using the foregoing method, which is not limited in the embodiments of this application.

In this embodiment, by displaying the sample virtual role face image in the face entry interface, and acquiring the sample face image when the user imitates an expression presented by the sample virtual role face image, the application program constructs the correspondence between the warping control parameter and the face parameter based on the sample face image and the sample virtual role face image, thereby avoiding a problem that the accuracy of subsequent virtual role expression imitation is affected by using the preset parameter mapping relationship in a case that a face parameter and/or a face warping parameter changes, and improving the quality of facial expression imitation of the virtual role.

It is to be understood that although the steps in the flowcharts of FIG. 2, FIG. 6, and FIG. 8 are sequentially displayed in accordance with instructions of arrows, these steps are not necessarily performed sequentially in the order indicated by the arrows. Unless otherwise explicitly specified in this application, execution of the steps is not strictly limited, and the steps may be performed in other sequences. Moreover, at least some of the steps in FIG. 2, FIG. 6, and FIG. 8 may include a plurality of sub-steps or a plurality of stages. These sub-steps or stages are not necessarily performed at the same moment, but may be performed at different moments. These sub-steps or stages are not necessarily executed sequentially, but may be performed with at least one part of the other steps or sub-steps of other steps or stages in turn.

Figure 10:
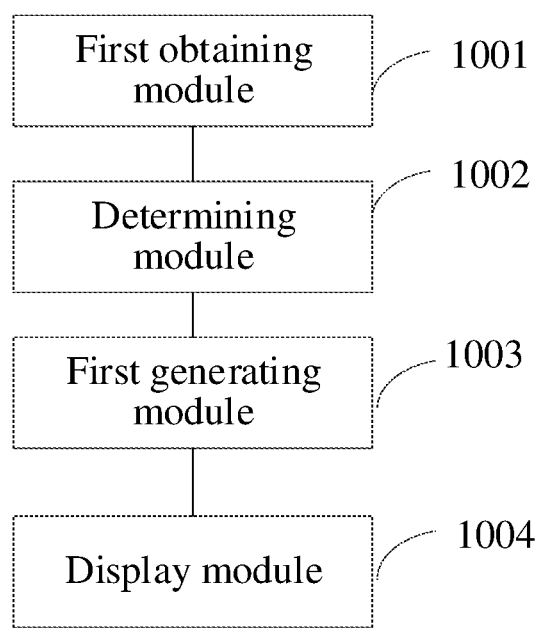
FIG. 10 is a structural block diagram of an apparatus for displaying a face of a virtual role according to an exemplary embodiment of this application.

FIG. 10 is a structural block diagram of an apparatus for displaying a face of a virtual role according to an exemplary embodiment of this application. The apparatus is applicable to a terminal, and the apparatus includes:

a first obtaining module 1001, configured to obtain a face parameter corresponding to a user face, the face parameter being used for indicating a facial feature of a corresponding face region of the user face;

a determining module 1002, configured to determine a warping control parameter according to the face parameter, the warping control parameter being used for controlling a warping degree of a corresponding face region of a virtual role;

a first generating module 1003, configured to generate a virtual role face image according to the warping control parameter and a warping image set, the warping image set including a basic face image and at least one basic warping face image of the virtual role, and different basic warping face images being corresponding to different warped face regions; and a display module 1004, configured to display the virtual role face image.

Optionally, the first generating module 1003 includes:

a first determining unit, configured to determine a target basic warping face image in the at least one basic warping face image according to the warping control parameter, the target basic warping face image and the warping control parameter being corresponding to the same face warping manner; and a generation unit, configured to generate the virtual role face image according to the warping control parameter, the basic face image, and the target basic warping face image.

Optionally, the generation unit is configured to:

determine at least one interpolation ratio according to the warping control parameter, the at least one interpolation ratio including a first interpolation ratio corresponding to the basic face image and a second interpolation ratio corresponding to the target basic warping face image, and the at least one interpolation ratio being used for controlling an interpolation degree between the basic face image and the target basic warping face image; and generate the virtual role face image according to the basic face image, the first interpolation ratio, the target basic warping face image, and the second interpolation ratio.

Optionally, the determining module 1002 includes:

an obtaining unit, configured to obtain a parameter mapping relationship, the parameter mapping relationship being used for indicating a correspondence between the face parameter and the warping control parameter; and a second determining unit, configured to determine the warping control parameter corresponding to the face parameter according to the parameter mapping relationship.

Optionally, the virtual role is a customized virtual role, and the apparatus further includes:

a second generating module, configured to generate a sample virtual role face image according to a sample warping control parameter;

a second obtaining module, configured to display the sample virtual role face image in a face entry interface, and obtain a sample face image, the sample face image being a face image acquired in a case that a user imitates the sample virtual role face image;

a third generating module, configured to generate a sample correspondence according to the sample warping control parameter and a sample face parameter corresponding to the sample face image; and a fourth generating module, configured to generate the parameter mapping relationship according to a plurality of groups of the sample correspondences.

Optionally, the first obtaining module 1001 includes:

an acquisition unit, configured to acquire, by using a camera, a face image of the user face in a target scenario; and a third determining unit, configured to determine the face parameter corresponding to the user face according to the face image.

Optionally, the camera is a depth camera, and the face image includes depth data corresponding to each pixel point.

The third determining unit is configured to:

input the face image to a face parameter prediction model, to obtain the face parameter outputted by the face parameter prediction model, the face parameter prediction model being a neural network model trained according to a sample face depth image and a sample face parameter corresponding to the sample face depth image.

Based on the above, in the embodiments of this application, by obtaining the face parameter of the user face and determining the warping control parameter of the virtual role according to the face parameter, the virtual role face image is generated and displayed according to the warping control parameter and the basic face image and the basic warping face image in the warping image set. Compared with the related art in which a 2D virtual role can only display a preset facial expression, in the embodiments of this application, the 2D virtual role can be driven to imitate a real-time expression of the user, thereby improving the intelligence level of displaying a facial expression, and achieving an effect of enriching a presentation mode of a face of the 2D virtual role.

The apparatus provided in the foregoing embodiments is illustrated with an example of division of the foregoing functional modules. In actual application, the functions may be allocated to and completed by different functional modules according to requirements, that is, the internal structure of the device is divided into different functional modules, to implement all or some of the functions described above. In addition, the apparatus for displaying a face of a virtual role provided in the foregoing embodiment belongs to the same concept as the method for displaying a face of a virtual role. For a specific implementation process of the apparatus, refer to the method embodiments. Details are not described herein again.

Figure 11:
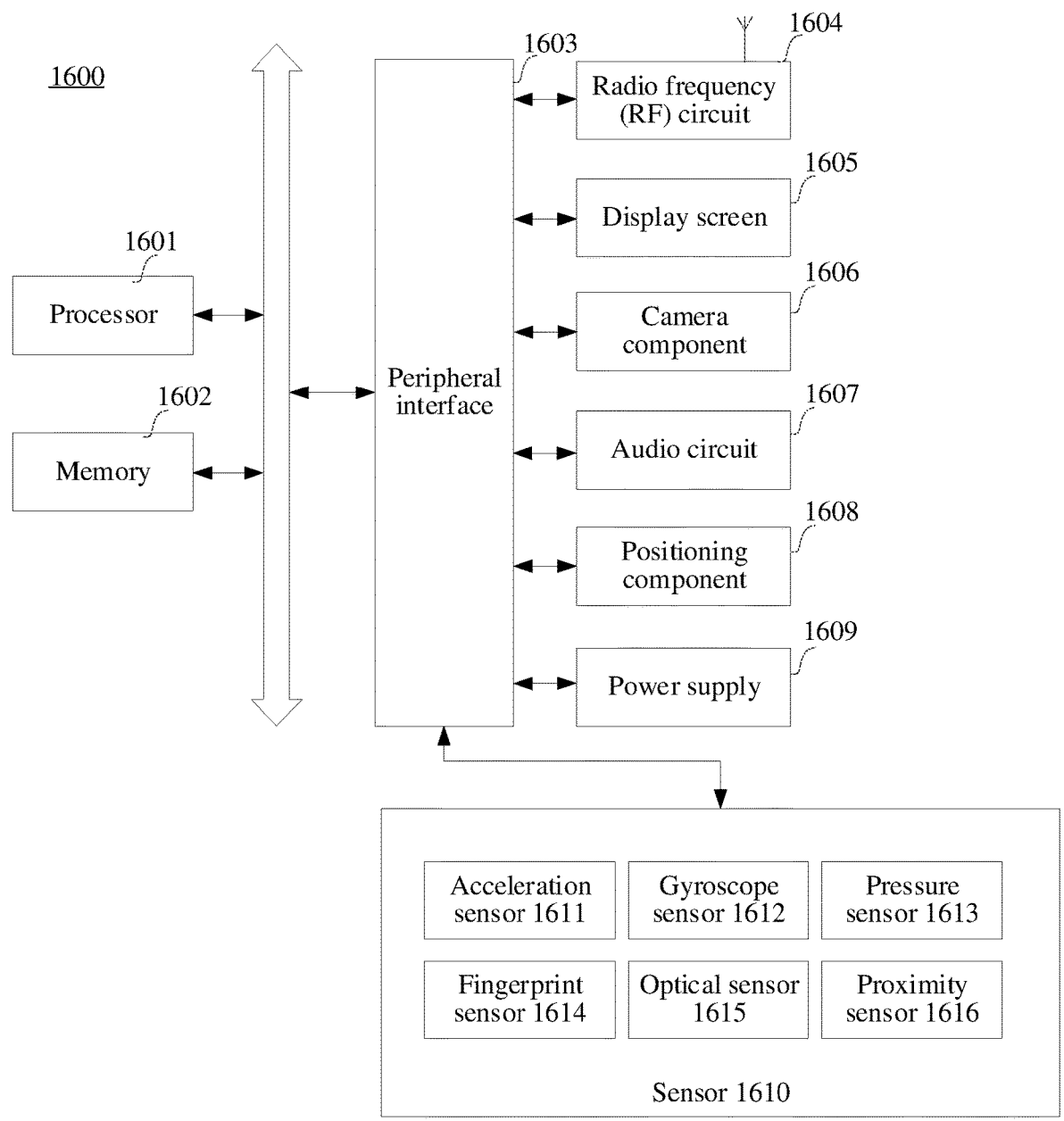
FIG. 11 is a structural block diagram of a terminal according to an exemplary embodiment of this application.

FIG. 11 is a structural block diagram of a terminal according to an exemplary embodiment of this application. The terminal 1600 may be a smartphone, a tablet computer, a moving picture experts group audio layer III (MP3) player, a moving picture experts group audio layer IV (MP4) player, a notebook computer, or a desktop computer. The terminal 1600 may also be referred to as a user equipment, a portable terminal, a laptop terminal, a desktop terminal, or another name.

Generally, the terminal 1600 includes a processor 1601 and a memory 1602.

The processor 1601 may include one or more processing cores, and may be, for example, a 4-core processor or an 8-core processor. The processor 1601 may be implemented in at least one hardware form of a digital signal processor (DSP), a field-programmable gate array (FPGA), and a programmable logic array (PLA). The processor 1601 may alternatively include a main processor and a coprocessor. The main processor is a processor that is configured to process data in an awake state, also referred to as a central processing unit (CPU), and the coprocessor is a low-power processor that is configured to process data in an idle state. In some embodiments, the processor 1601 may be integrated with a graphics processing unit (GPU). The GPU is configured to render and draw content that needs to be displayed on a display screen. In some embodiments, the processor 1601 may further include an artificial intelligence (AI) processor. The AI processor is configured to process computing operations related to machine learning.

The memory 1602 may include one or more computer-readable storage media. The computer-readable storage medium may be non-transient. The memory 1602 may further include a high-speed random access memory and a non-volatile memory, for example, one or more disk storage devices or flash memory devices. In some embodiments, a non-transitory computer-readable storage medium in the memory 1602 is configured to store at least one instruction, the at least one instruction being configured to be executed by the processor 1601 to implement the method provided in the method embodiments of this application.

In some embodiments, the terminal 1600 may optionally include: a peripheral interface 1603 and at least one peripheral. The processor 1601, the memory 1602, and the peripheral interface 1603 may be connected by using a bus or a signal cable. Each peripheral may be connected to the peripheral interface 1603 by using a bus, a signal cable, or a circuit board. Specifically, the peripheral includes: at least one of a radio frequency (RF) circuit 1604, a touch display screen 1605, a camera component 1606, an audio circuit 1607, a positioning component 1608, and a power supply 1609.

The peripheral interface 1603 may be configured to connect the at least one peripheral related to input/output (I/O) to the processor 1601 and the memory 1602. In some embodiments, the processor 1601, the memory 1602, and the peripheral interface 1603 are integrated on the same chip or circuit board. In some other embodiments, any one or two of the processor 1601, the memory 1602, and the peripheral interface 1603 may be implemented on a separate chip or circuit board, which is not limited in this embodiment.

The RF circuit 1604 is configured to receive and transmit an RF signal, also referred to as an electromagnetic signal. The RF circuit 1604 communicates with a communication network and other communication devices by using the electromagnetic signal. The RF circuit 1604 converts an electric signal into an electromagnetic signal for transmission, or converts a received electromagnetic signal into an electric signal. Optionally, the RF circuit 1604 includes: an antenna system, an RF transceiver, one or more amplifiers, a tuner, an oscillator, a digital signal processor, a codec chip set, a subscriber identity module card, and the like. The RF circuit 1604 may communicate with another terminal by using at least one wireless communication protocol. The wireless communication protocol includes, but is not limited to: a world wide web, a metropolitan area network, an intranet, generations of mobile communication networks (2G, 3G, 4G, and 5G), a wireless local area network, and/or a wireless fidelity (Wi-Fi) network. In some embodiments, the RF circuit 1604 may further include a circuit related to near field communication (NFC), which is not limited in this application.

The display screen 1605 is configured to display a user interface (UI). The UI may include a graph, text, an icon, a video, and any combination thereof. When the display screen 1605 is a touch display screen, the display screen 1605 also has a capability to collect a touch signal on or above a surface of the display screen 1605. The touch signal may be used as a control signal to be inputted to the processor 1601 for processing. In this case, the display screen 1605 may be further configured to provide a virtual button and/or a virtual keyboard that are/is also referred to as a soft button and/or a soft keyboard. In some embodiments, there may be one display screen 1605, disposed on a front panel of the terminal 1600. In some other embodiments, there may be at least two display screens 1605, respectively disposed on different surfaces of the terminal 1600 or designed in a foldable shape. In still some other embodiments, the display screen 1605 may be a flexible display screen, disposed on a curved surface or a folded surface of the terminal 1600. Even, the display screen 1605 may be further set in a non-rectangular irregular pattern, namely, a special-shaped screen. The display screen 1605 may be prepared by using materials such as a liquid crystal display (LCD), an organic light-emitting diode (OLED), or the like.

A camera component 1606 is configured to collect an image or a video. Optionally, the camera component 1606 includes a front-facing camera and a rear-facing camera. Generally, the front-facing camera is disposed on the front panel of the terminal, and the rear-facing camera is disposed on a back surface of the terminal. In some embodiments, there are at least two rear-facing cameras, which are respectively any of a main camera, a depth-of-field camera, a wide-angle camera, and a telephoto camera, to achieve background blurring function through fusion of the main camera and the depth-of-field camera, panoramic photographing and virtual reality (VR) photographing through fusion of the main camera and the wide-angle camera, or other fusion photographing functions. In some embodiments, the camera component 1606 may further include a flashlight. The flashlight may be a monochrome temperature flashlight, or may be a double color temperature flashlight. The double color temperature flash refers to a combination of a warm light flash and a cold light flash, and may be used for light compensation under different color temperatures.

The audio circuit 1607 may include a microphone and a speaker. The microphone is configured to collect sound waves of a user and an environment, and convert the sound waves into electrical signals and input the electrical signals into the processor 1601 for processing, or input the electrical signals into the RF circuit 1604 to implement speech communication. For a purpose of stereo collection or noise reduction, there may be a plurality of microphones disposed at different portions of the terminal 1600 respectively. The microphone may further be an array microphone or an omni-directional collection type microphone. The speaker is configured to convert electrical signals from the processor 1601 or the RF circuit 1604 into sound waves. The speaker may be a conventional thin-film speaker or a piezoelectric ceramic speaker. When the speaker is the piezoelectric ceramic speaker, electrical signals not only can be converted into sound waves that can be heard by human, but also can be converted into sound waves that cannot be heard by human for ranging and the like. In some embodiments, the audio circuit 1607 may also include an earphone jack.

The positioning component 1608 is configured to position a current geographic location of the terminal 1600, to implement a navigation or a location based service (LBS).

The positioning component 1608 may be a positioning assembly based on the Global Positioning System (GPS) of the United States, the China's Beidou Navigation Satellite System (BDS), or the Galileo system of Russia.

The power supply 1609 is configured to supply power to assemblies in the terminal 1600. The power supply 1609 may be an alternating current, a direct current, a primary battery, or a rechargeable battery. In a case that the power supply 1609 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may be further configured to support a quick charge technology.

In some embodiments, the terminal 1600 further includes one or more sensors 1610. The one or more sensors 1610 include, but are not limited to: an acceleration sensor 1611, a gyroscope sensor 1612, a pressure sensor 1613, a fingerprint sensor 1614, an optical sensor 1615, and a proximity sensor 1616.

The acceleration sensor 1611 may detect a magnitude of acceleration on three coordinate axes of a coordinate system established with the terminal 1600. For example, the acceleration sensor 1611 may be configured to detect components of gravity acceleration on the three coordinate axes. The processor 1601 may control, according to a gravity acceleration signal collected by the acceleration sensor 1611, the touch display screen 1605 to display the UI in a landscape view or a portrait view. The acceleration sensor 1611 may be further configured to collect motion data of a game or a user.

The gyroscope sensor 1612 may detect a body direction and a rotation angle of the terminal 1600. The gyroscope sensor 1612 may cooperate with the acceleration sensor 1611 to collect a 3D action by the user on the terminal 1600. The processor 1601 may implement the following functions according to data collected by the gyroscope sensor 1612: motion sensing (for example, the UI is changed according to a tilt operation of a user), image stabilization during shooting, game control, and inertial navigation.

The pressure sensor 1613 may be disposed on a side frame of the terminal 1600 and/or a lower layer of the touch display screen 1605. When the pressure sensor 1613 is disposed on the side frame of the terminal 1600, a holding signal of the user on the terminal 1600 may be detected. The processor 1601 performs left and right hand recognition or a quick operation according to the holding signal collected by the pressure sensor 1613. When the pressure sensor 1613 is disposed on the lower layer of the touch display screen 1605, the processor 1601 controls, according to a pressure operation of the user on the touch display screen 1605, an operable control on the UI. The operable control includes at least one of a button control, a scroll bar control, an icon control, and a menu control.

The fingerprint sensor 1614 is configured to collect a fingerprint of a user, and the processor 1601 recognizes an identity of the user according to the fingerprint collected by the fingerprint sensor 1614, or the fingerprint sensor 1614 recognizes the identity of the user based on the collected fingerprint. When identifying that the identity of the user is a trusted identity, the processor 1601 authorizes the user to perform related sensitive operations. The sensitive operations include: unlocking a screen, viewing encryption information, downloading software, paying and changing a setting, and the like. The fingerprint sensor 1614 may be disposed on a front face, a back face, or a side face of the terminal 1600. When a physical button or a vendor logo is disposed on the terminal 1600, the fingerprint sensor 1614 may be integrated together with the physical button or the vendor logo.

The optical sensor 1615 is configured to collect ambient light intensity. In an embodiment, the processor 1601 may control display luminance of the touch display screen 1605 according to the ambient light intensity collected by the optical sensor 1615. Specifically, when the ambient light intensity is relatively high, the display luminance of the touch display screen 1605 is increased. When the ambient light intensity is relatively low, the display luminance of the touch display screen 1605 is reduced. In another embodiment, the processor 1601 may further dynamically adjust a camera parameter of the camera component 1606 according to the ambient light intensity collected by the optical sensor 1615.

The proximity sensor 1616, also referred to as a distance sensor, is generally disposed on the front panel of the terminal 1600. The proximity sensor 1616 is configured to collect a distance between the user and the front face of the terminal 1600. In an embodiment, when the proximity sensor 1616 detects that a distance between the user and the front face of the terminal 1600 gradually becomes smaller, the touch display screen 1605 is controlled by the processor 1601 to switch from a screen-on state to a screen-off state. When the proximity sensor 1616 detects that the distance between the user and the front face of the terminal 1600 gradually becomes larger, the touch display screen 1605 is controlled by the processor 1601 to switch from the screen-off state to the screen-on state.

A person skilled in the art may understand that a structure shown in FIG. 16 constitutes no limitation on the terminal 1600, and the terminal may include more or fewer components than those shown in the figure, or some components may be combined, or a different component deployment may be used.

A person of ordinary skill in the art may understand that all or a part of the steps of the methods in the embodiments may be implemented by a program instructing relevant hardware. The program may be stored in a computer-readable storage medium. The computer-readable storage medium may be the computer-readable storage medium included in the memory in the foregoing embodiment, or may be a computer-readable storage medium that exists independently and that is not assembled in a terminal. The computer-readable storage medium stores at least one instruction, at least one program, a code set or an instruction set, the at least one instruction, the at least one program, the code set or the instruction set being loaded and executed by a processor to implement the method for displaying a face of a virtual role provided in the foregoing embodiments.

According to another aspect, a computer device is provided, including a processor and a memory, the memory storing at least one instruction, at least one program, a code set or an instruction set, the at least one instruction, the at least one program, the code set or the instruction set being loaded and executed by the processor to implement the method for displaying a face of a virtual role provided in the foregoing embodiments.

According to another aspect, a computer-readable storage medium is provided, storing at least one instruction, at least one program, a code set or an instruction set, the at least one instruction, the at least one program, the code set or the instruction set being loaded and executed by a processor to implement the method for displaying a face of a virtual role provided in the foregoing embodiments.

According to another aspect, a computer program product is provided, the computer program product, when run on a computer, causing the computer to perform the method for displaying a face of a virtual role provided in the foregoing method embodiments.

A person of ordinary skill in the art may understand that all or some of procedures of the methods in the foregoing embodiments may be implemented by a computer program instructing relevant hardware. The program may be stored in a non-volatile computer-readable storage medium. When the program is executed, the procedures of the foregoing method embodiments may be included. Any reference to a memory, a storage, a database, or another medium used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external high-speed cache. For the purpose of description instead of limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a RAM bus (Rambus) direct RAM (RDRAM), a direct Rambus dynamic RAM (DRDRAM), and a Rambus dynamic RAM (RDRAM).

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification. The foregoing embodiments only describe several implementations of this application specifically and in detail, but cannot be construed as a limitation to the patent scope of this application. For a person of ordinary skill in the art, several transformations and improvements can be made without departing from the idea of this application, which all fall within the protection scope of this application. Therefore, the protection scope of the patent of this application shall be subject to the appended claims.

What is claimed is:

1. A method for displaying a face of a virtual role, the method comprising:
obtaining, by a device comprising a memory storing instructions and a processor in communication with the memory, a face parameter corresponding to a user face, the face parameter being used for indicating a facial feature of a face region of the user face;
determining, by the device, a warping control parameter according to the face parameter, the warping control parameter being used for controlling a warping degree of a face region of a virtual role, by:
obtaining, by the device, a parameter mapping relationship indicating a correspondence between the face parameter and the warping control parameter, and
determining, by the device, the warping control parameter corresponding to the face parameter according to the parameter mapping relationship;
generating, by the device, a virtual role face image according to the warping control parameter and a warping image set, the warping image set comprising a basic face image and at least one basic warping face image of the virtual role, and different basic warping face images corresponding to different face warping manners;
displaying, by the device, the virtual role face image; and
wherein:
the virtual role is a customized virtual role; and
the method further comprises:
generating, by the device, a sample virtual role face image according to a sample warping control parameter corresponding to the customized virtual role,
displaying, by the device, the sample virtual role face image in a face entry interface,
obtaining a sample face image, the sample face image being a face image acquired in a case that a user imitates the sample virtual role face image,
generating, by the device, a sample correspondence according to the sample warping control parameter and a sample face parameter corresponding to the sample face image, and
generating, by the device, the parameter mapping relationship according to the sample correspondence.

2. The method according to claim 1, wherein the generating the virtual role face image according to the warping control parameter and the warping image set comprises:
determining, by the device, a target basic warping face image in the at least one basic warping face image according to the warping control parameter, the target basic warping face image and the warping control parameter being corresponding to a same face warping manner; and
generating, by the device, the virtual role face image according to the warping control parameter, the basic face image, and the target basic warping face image.

3. The method according to claim 2, wherein the generating the virtual role face image according to the warping control parameter, the basic face image, and the target basic warping face image comprises:
determining, by the device, at least one interpolation ratio according to the warping control parameter, the at least one interpolation ratio comprising a first interpolation ratio corresponding to the basic face image and a second interpolation ratio corresponding to the target basic warping face image, and the at least one interpolation ratio being used for controlling an interpolation degree between the basic face image and the target basic warping face image; and
generating, by the device, the virtual role face image according to the basic face image, the first interpolation ratio, the target basic warping face image, and the second interpolation ratio.

4. The method according to claim 1, wherein the obtaining the face parameter corresponding to the user face comprises:
acquiring, by the device with a camera, a face image of the user face in a target scenario; and
determining, by the device, the face parameter corresponding to the user face according to the face image.

5. The method according to claim 4, wherein:
the camera is a depth camera;
the face image comprises depth data corresponding to each pixel; and
the determining the face parameter corresponding to the user face according to the face image comprises:
inputting, by the device, the face image to a face parameter prediction model, to obtain the face parameter outputted by the face parameter prediction model, the face parameter prediction model being a neural network model trained according to a sample face depth image and a sample face parameter corresponding to the sample face depth image.

6. An apparatus for displaying a face of a virtual role, the apparatus comprising:

a memory storing instructions;

a processor in communication with the memory, wherein, when the processor executes the instructions, the processor is configured to cause the apparatus to:

obtain a face parameter corresponding to a user face, the face parameter being used for indicating a facial feature of a face region of the user face, determine a warping control parameter according to the face parameter, the warping control parameter being used for controlling a warping degree of a face region of a virtual role, by:

obtaining a parameter mapping relationship indicating a correspondence between the face parameter and the warping control parameter, and determining the warping control parameter corresponding to the face parameter according to the parameter mapping relationship, generate a virtual role face image according to the warping control parameter and a warping image set, the warping image set comprising a basic face image and at least one basic warping face image of the virtual role, and different basic warping face images corresponding to different face warping manners, and display the virtual role face image; and wherein:

the virtual role is a customized virtual role; and when the processor executes the instructions, the processor is configured to further cause the apparatus to:

generate a sample virtual role face image according to a sample warping control parameter corresponding to the customized virtual role, display the sample virtual role face image in a face entry interface, obtain a sample face image, the sample face image being a face image acquired in a case that a user imitates the sample virtual role face image, generate a sample correspondence according to the sample warping control parameter and a sample face parameter corresponding to the sample face image, and generate the parameter mapping relationship according to the sample correspondence.

7. The apparatus according to claim 6, wherein, when the processor is configured to cause the apparatus to generate the virtual role face image according to the warping control parameter and the warping image set, the processor is configured to cause the apparatus to:

determine a target basic warping face image in the at least one basic warping face image according to the warping control parameter, the target basic warping face image and the warping control parameter being corresponding to a same face warping manner; and generate the virtual role face image according to the warping control parameter, the basic face image, and the target basic warping face image.

8. The apparatus according to claim 7, wherein, when the processor is configured to cause the apparatus to generate the virtual role face image according to the warping control parameter, the basic face image, and the target basic warping face image, the processor is configured to cause the apparatus to:

determine at least one interpolation ratio according to the warping control parameter, the at least one interpolation ratio comprising a first interpolation ratio corresponding to the basic face image and a second interpolation ratio corresponding to the target basic warping face image, and the at least one interpolation ratio being used for controlling an interpolation degree between the basic face image and the target basic warping face image; and generate the virtual role face image according to the basic face image, the first interpolation ratio, the target basic warping face image, and the second interpolation ratio.

9. The apparatus according to claim 6, wherein, when the processor is configured to cause the apparatus to obtain the face parameter corresponding to the user face, the processor is configured to cause the apparatus to:

acquire, by a camera, a face image of the user face in a target scenario; and determine the face parameter corresponding to the user face according to the face image.

10. The apparatus according to claim 9, wherein:

the camera is a depth camera;

the face image comprises depth data corresponding to each pixel; and when the processor is configured to cause the apparatus to determine the face parameter corresponding to the user face according to the face image, the processor is configured to cause the apparatus to:

input the face image to a face parameter prediction model, to obtain the face parameter outputted by the face parameter prediction model, the face parameter prediction model being a neural network model trained according to a sample face depth image and a sample face parameter corresponding to the sample face depth image.

11. A non-transitory computer-readable storage medium storing computer-readable instructions, wherein, the computer-readable instructions, when executed by a processor, are configured to cause the processor to perform:

obtaining a face parameter corresponding to a user face, the face parameter being used for indicating a facial feature of a face region of the user face;

determining a warping control parameter according to the face parameter, the warping control parameter being used for controlling a warping degree of a face region of a virtual role, obtaining a parameter mapping relationship indicating a correspondence between the face parameter and the warping control parameter, and determining the warping control parameter corresponding to the face parameter according to the parameter mapping relationship;

generating a virtual role face image according to the warping control parameter and a warping image set, the warping image set comprising a basic face image and at least one basic warping face image of the virtual role, and different basic warping face images corresponding to different face warping manners;

displaying the virtual role face image; and wherein:

the virtual role is a customized virtual role; and when the computer-readable instructions are executed by the processor, the computer-readable instructions are configured to further cause the processor to perform:

generating a sample virtual role face image according to a sample warping control parameter corresponding to the customized virtual role, displaying the sample virtual role face image in a face entry interface, obtaining a sample face image, the sample face image being a face image acquired in a case that a user imitates the sample virtual role face image, generating a sample correspondence according to the sample warping control parameter and a sample face parameter corresponding to the sample face image, and generating the parameter mapping relationship according to the sample correspondence.

12. The non-transitory computer-readable storage medium according to claim 11, wherein, when the computer-readable instructions are configured to cause the processor to perform generating the virtual role face image according to the warping control parameter and the warping image set, the computer-readable instructions are configured to cause the processor to perform:

determining a target basic warping face image in the at least one basic warping face image according to the warping control parameter, the target basic warping face image and the warping control parameter being corresponding to a same face warping manner; and generating the virtual role face image according to the warping control parameter, the basic face image, and the target basic warping face image.

13. The non-transitory computer-readable storage medium according to claim 12, wherein, when the computer-readable instructions are configured to cause the processor to perform generating the virtual role face image according to the warping control parameter, the basic face image, and the target basic warping face image, the computer-readable instructions are configured to cause the processor to perform:

determining at least one interpolation ratio according to the warping control parameter, the at least one interpolation ratio comprising a first interpolation ratio corresponding to the basic face image and a second interpolation ratio corresponding to the target basic warping face image, and the at least one interpolation ratio being used for controlling an interpolation degree between the basic face image and the target basic warping face image; and generating the virtual role face image according to the basic face image, the first interpolation ratio, the target basic warping face image, and the second interpolation ratio.

14. The non-transitory computer-readable storage medium according to claim 11, wherein, when the computer-readable instructions are configured to cause the processor to perform obtaining the face parameter corresponding to the user face, the computer-readable instructions are configured to cause the processor to perform:

acquiring, by a camera, a face image of the user face in a target scenario; and determining the face parameter corresponding to the user face according to the face image.

\* \* \* \* \*

UNITED STATES PATENT AND TRADEMARK OFFICE
CERTIFICATE OF CORRECTION

PATENT NO. : 11,423,509 B2
APPLICATION NO. : 17/315562
DATED : August 23, 2022
INVENTOR(S) : Chao Shen It is certified that error appears in the above-identified patent and that said Letters Patent is hereby corrected as shown below:

In the Claims

In Column 24, Claim 11, Line 56, insert -- by: -- after "role,".

Signed and Sealed this
First Day of November, 2022

Katherine Kelly Vidal
Director of the United States Patent and Trademark Office